US012756323B2

(12) United States Patent
Kado et al.

(10) Patent No.: US 12,756,323 B2
(45) Date of Patent: Oct. 6, 2026

(54) SWITCHING POWER SUPPLY DEVICE WITH SYNCHRONOUS RECTIFICATION

(71) Applicants: Minoru Kado, Sagamihara (JP); Takeshi Sato, Yokohama (JP)

(72) Inventors: Minoru Kado, Sagamihara (JP); Takeshi Sato, Yokohama (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 221 days.

(21) Appl. No.: 18/414,515

(22) Filed: Jan. 17, 2024

(65) Prior Publication Data

US 2024/0243668 A1 Jul. 18, 2024

(30) Foreign Application Priority Data

Jan. 18, 2023 (JP) ................................ 2023-005524

(51) Int. Cl.
*H02M 3/335* (2006.01)
*H02M 1/00* (2007.01)

(52) U.S. Cl.
CPC ..... *H02M 3/33592* (2013.01); *H02M 1/0025* (2021.05); *H02M 1/0058* (2021.05)

(58) Field of Classification Search
CPC ........... H02M 3/33592; H02M 1/0025; H02M 1/0058
See application file for complete search history.

(56) References Cited

U.S. PATENT DOCUMENTS

| | | | | |
|---|---|---|---|---|
| 10,784,791 B2 * | 9/2020 | Feng | H03K 17/18 |
| 12,218,602 B2 * | 2/2025 | Angkititrakul | H02M 1/36 |
| 2015/0023062 A1 * | 1/2015 | Hyugaji | H02M 3/33592 363/16 |
| 2015/0349652 A1 * | 12/2015 | Lefedjiev | H02M 1/36 363/21.14 |
| 2019/0393794 A1 * | 12/2019 | Feng | H03K 17/18 |
| 2020/0161985 A1 * | 5/2020 | Li | H02M 1/08 |
| 2020/0280264 A1 * | 9/2020 | Kado | H02M 3/33523 |

(Continued)

FOREIGN PATENT DOCUMENTS

JP 4862432 B2 1/2012

*Primary Examiner* — Gustavo A Rosario-Benitez
(74) *Attorney, Agent, or Firm* — Shih IP Law Group, PLLC.

(57) ABSTRACT

A switching power supply device with synchronous rectification includes a transformer that receives an input voltage on a primary side, a synchronous rectifier element that conducts/breaks a current of a secondary-side coil of the transformer, and a synchronous rectifier control circuit that drives the synchronous rectifier element to be on/off. The synchronous rectifier control circuit includes an ON-timing detection circuit that detects a turn-on timing to turn on the synchronous rectifier element based on a terminal voltage of the synchronous rectifier element, an OFF-timing detection circuit that detects a turn-off timing to turn off the synchronous rectifier element by comparing the terminal voltage of the synchronous rectifier element with a predetermined turn-off threshold voltage, and an ON/OFF control circuit that generates an ON/OFF control signal for the synchronous rectifier element based on an output signal of the ON-timing detection circuit and an output signal of the OFF-timing detection circuit.

4 Claims, 9 Drawing Sheets

(56) References Cited

U.S. PATENT DOCUMENTS

| | | | | |
|---|---|---|---|---|
| 2020/0313562 | A1* | 10/2020 | Hyugaji | H02M 3/33592 |
| 2021/0376745 | A1* | 12/2021 | Zong | H02M 1/08 |
| 2023/0327569 | A1* | 10/2023 | Lee | H02M 3/33571 |
| 2023/0387818 | A1* | 11/2023 | Khamesra | H02M 3/33592 |
| 2023/0412088 | A1* | 12/2023 | Xiao | H02M 3/33571 |
| 2024/0154535 | A1* | 5/2024 | Ding | H02M 1/08 |

* cited by examiner

SWITCHING POWER SUPPLY DEVICE WITH SYNCHRONOUS RECTIFICATION

REFERENCE TO RELATED APPLICATIONS

This application is based upon and claims the benefit of priority from the prior Japanese Patent Application No. 2023-005524, filed on Jan. 18, 2023, the entire content of which is incorporated herein by reference.

TECHNICAL FIELD

The present disclosure relates to a direct-current power supply device with switching control including a transformer for voltage conversion; for example, relates to a technique effective by being used in an insulated DC-DC converter including a synchronous rectifier circuit on the secondary side of a transformer for voltage conversion.

DESCRIPTION OF RELATED ART

As a type of switching power supply device, there is a switching power supply device (insulated DC-DC converter) that includes an MOS transistor (metal-oxide-semiconductor field-effect transistor) as a switching element for intermittently flowing a current to a primary-side coil of a transformer and a control circuit (IC) that performs ON/OFF control of the element. As a type of this switching power supply device, there is a switching power supply device that rectifies, with a rectifier element, a current in a secondary-side coil induced by flowing a current to the primary-side coil, smooths, with a capacitor, the rectified current, and outputs the smoothed current. However, in such an insulated DC-DC converter using a diode as a rectifier element in a secondary-side circuit, loss in the diode for rectification is large, which reduces the efficiency.

In order to deal with the problem, there is a technique for reducing the loss in a rectifier element and achieving a high efficiency. This technique is a technique of, in place of a diode for rectification in a secondary-side circuit, providing a switching element (MOS transistor) for synchronous rectification therein and, with a secondary-side control circuit, detecting a terminal voltage (source-drain voltage) of the switching element and performing turn-on control of the switching element in sync with an OFF timing of a switching element in a primary-side circuit.

For example, JP 4,862,432 B1 discloses a technique of, in a switching power supply device with synchronous rectification, adjusting an OFF timing of a secondary-side synchronous rectifier element, thereby reducing the loss. Ideally, a secondary-side synchronous rectifier element is turned off when a current therein is zero.

The device disclosed in JP 4,862,432 B1 includes a first timing detection circuit that detects a first timing at which a forward current flows through a body diode of a switching element for synchronous rectification, a second timing detection circuit that detects a change timing of an ON/OFF control signal for the switching element for synchronous rectification, and a third timing detection circuit that detects a third timing with a counter electromotive voltage generated at an instant when the body diode is turned off, wherein the ON/OFF control signal for the switching element for synchronous rectification is generated to turn on the switching element at the first timing, to turn off the switching element before the third timing, and to bring an OFF timing of the switching element close to the third timing.

SUMMARY OF THE INVENTION

In the switching power supply device with synchronous rectification disclosed by JP 4,862,432 B1, if the gate capacitance of the MOS transistor for synchronous rectification is large, as shown in FIG. 7, at a turn-off-detected timing of detecting that a voltage at a drain terminal VD has reached a turn-off threshold voltage Vth_OFF, the peak of a discharge current for releasing a charge of the gate capacitance to drop a voltage at a gate terminal VG becomes high. This causes high-frequency noise (Problem 1).

Further, in a case where a control circuit is set to apply a sufficiently high gate voltage in order to keep ON-resistance of the MOS transistor for synchronous rectification low (indicated by solid lines in FIG. 8), even if a drain current Id of the synchronous rectifier transistor decreases, the voltage at the drain terminal VD hardly increases, as compared to that in a case where the voltage at the gate terminal VG is low (indicated by dash-dot lines in FIG. 8). Hence, the turn-off timing cannot be detected accurately.

Further, if the threshold voltage Vth_OFF has a variation to the plus (positive) side under the condition that the ON-resistance is set at a small value, the turn-off timing is detected late, and as indicated by broken lines in FIG. 9, the drain current Id flows backward and a surge indicated by a broken line S occurs in the voltage at the drain terminal VD. It is therefore necessary to turn off the synchronous rectifier transistor early to provide a rectification period by the body diode. However, if the turn-off timing is too early, a time in which the current flows in the body diode becomes long and the loss increases (Problem 2).

The present inventors have considered ways to solve the above two problems and come up with two solutions. A first solution is providing a synchronous rectifier control circuit with a function (correction circuit) of adjusting the turn-off threshold voltage Vth_OFF for the synchronous rectifier transistor, and a second solution is reducing, immediately before turn-off of the synchronous rectifier transistor, the gate voltage of the synchronous rectifier transistor at the time of turn-off thereof. In relation to the second solution, there is provided an IC that performs control to reduce the gate voltage at the time of turn-off of a synchronous rectifier transistor. Further, U.S. Pat. No. 10,784,791 B2 discloses a switching power supply device in which the gate voltage has a similar waveform to that of the IC.

However, in the case of the first solution, detection of turn-off of the synchronous rectifier transistor is easily influenced by the correction/adjustment accuracy of the turn-off threshold voltage Vth_OFF in the case where the slope of the waveform of the voltage at the drain terminal VD is gradual. If a high-accuracy correction circuit is used in view of this, the circuit to be used is large. Meanwhile, it has been found that if the synchronous rectifier transistor is turned off early in accordance with a low correction accuracy, the rectification period by the body diode becomes long and the loss increases (Problem 3).

The second solution of reducing the gate voltage at the time of turn-off of the synchronous rectifier transistor has an advantage of being able to suppress high-frequency noise by reducing the peak of the discharge current at the time of turn-off thereof. Further, since the slope of the waveform of the drain voltage differs depending on the ON-resistance of the synchronous rectifier transistor, the second solution also has an advantage of being able to shorten the rectification period by the body diode immediately before turn-off of the synchronous rectifier transistor by reducing the gate voltage immediately before turn-off thereof to increase the ON-resistance, thereby increasing the upward slope of the waveform of the drain voltage.

However, in the case of the second solution, because the turn-off threshold voltage and the discharge start voltage may have variations due to variation in manufacturing ICs, in order not to shift to the turn-off operation before the discharge starts, it is necessary, as shown in FIG. 10, to provide a potential difference ΔV including a margin for preventing malfunctions between the turn-off threshold voltage Vth_OFF and a discharge start voltage Vth4. Further, it has been found that if the discharge start voltage Vth4 is low, as indicated by a dash-dot line in FIG. 11, a discharge start point Tds is moved earlier and the voltage at the gate terminal VG decreases at an early stage and accordingly the ON-resistance increases, which may increase conduction loss (Problem 4).

The present disclosure has been made in view of the above problems, and one of the objects thereof is providing a switching power supply device that can suppress high-frequency noise by reducing the current peak at the time of turn-off of a synchronous rectifier transistor.

Another one of the objects of the present disclosure is providing a switching power supply device that can reduce the loss in a synchronous rectifier transistor by shortening the rectification period by a body diode of the synchronous rectifier transistor immediately before turn-off of the synchronous rectifier transistor.

Another one of the objects of the present disclosure is providing a switching power supply device that can set the level of a discharge start voltage to be high by adjusting a turn-off threshold voltage for a synchronous rectifier transistor to the optimum voltage value, and accordingly can suppress increase in the conduction loss.

In order to achieve at least one of the objects of the present disclosure, there is provided a switching power supply device with synchronous rectification, including:

- a transformer that receives an input voltage on a primary side;
- a synchronous rectifier element that conducts/breaks a current of a secondary-side coil of the transformer; and
- a synchronous rectifier control circuit that drives the synchronous rectifier element to be on/off,
- wherein the synchronous rectifier control circuit includes:
  - an ON-timing detection circuit that detects a turn-on timing to turn on the synchronous rectifier element based on a terminal voltage of the synchronous rectifier element;
  - an OFF-timing detection circuit that detects a turn-off timing to turn off the synchronous rectifier element by comparing the terminal voltage of the synchronous rectifier element with a predetermined turn-off threshold voltage; and
  - an ON/OFF control circuit that generates an ON/OFF control signal for the synchronous rectifier element based on an output signal of the ON-timing detection circuit and an output signal of the OFF-timing detection circuit.

BRIEF DESCRIPTION OF DRAWINGS

The accompanying drawings are not intended as a definition of the limits of the present disclosure but illustrate embodiments of the disclosure, and together with the general description given above and the detailed description of the embodiments given below, serve to explain the principles of the disclosure, wherein.

DETAILED DESCRIPTION

Hereinafter, one or more embodiments of the present disclosure will be described with reference to the drawings.

Figure 1:
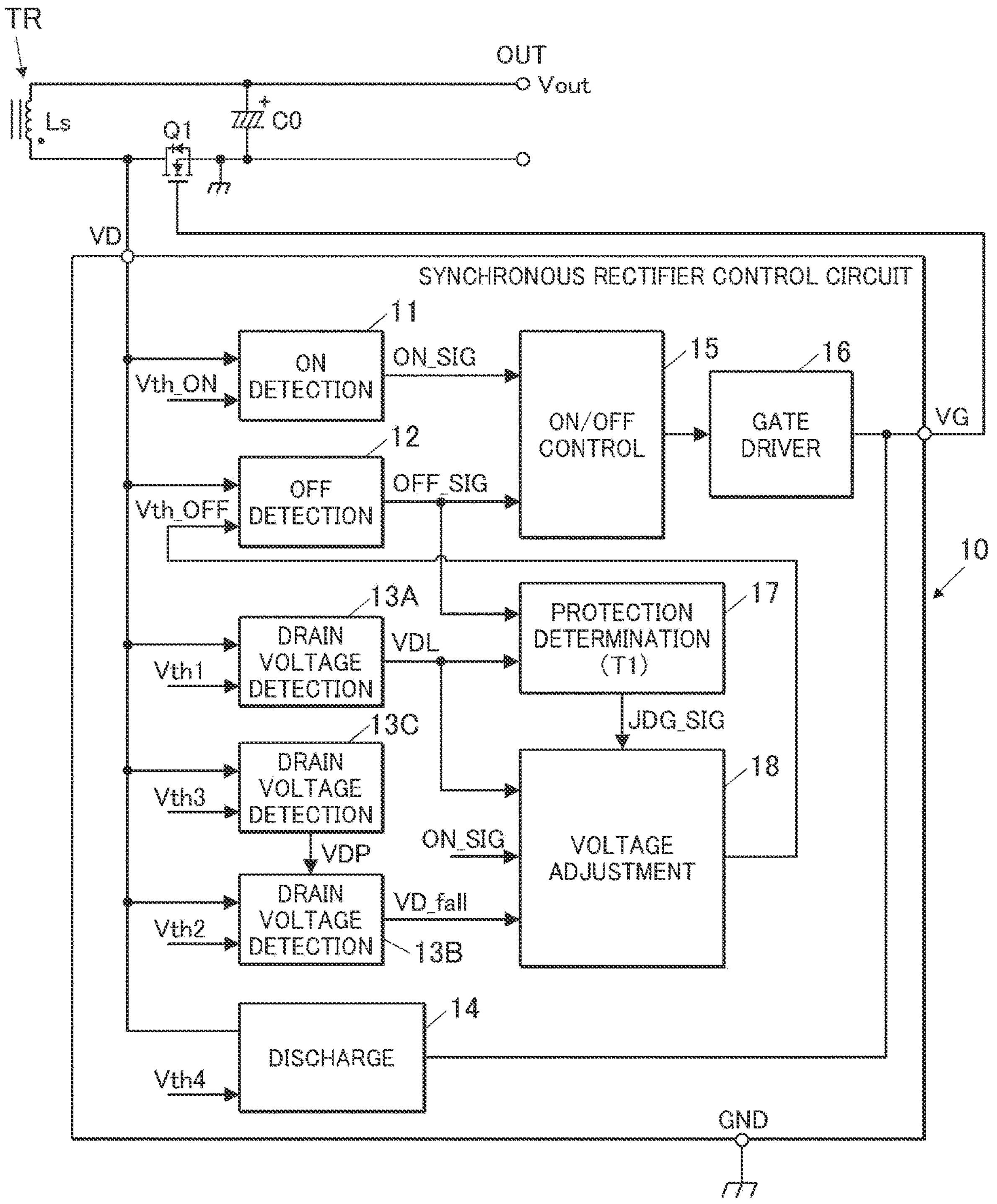
FIG. 1 is a block diagram showing an embodiment of a DC converter with synchronous rectification to which the present disclosure is applied.

FIG. 1 shows an embodiment of a DC converter with synchronous rectification to which the present disclosure is applied.

Although not particularly limited, the DC converter of this embodiment includes a transformer TR having a primary-side coil to which a direct-current voltage is input. One terminal of a secondary-side coil Ls of the transformer TR is connected to a ground point via a synchronous rectifier element (synchronous rectifier transistor) Q1 composed of an N-channel MOS transistor.

The other terminal of the secondary-side coil Ls is connected to an output terminal OUT, and a smoothing capacitor C0 is connected between the output terminal OUT and the ground point. Accordingly, the source terminal of the synchronous rectifier transistor Q1 is connected to the ground point.

A switching element is connected in series with the primary-side coil of the transformer TR, and this switching element is intermittently turned on/off by a primary-side control circuit to accumulate energy in the transformer TR. A current induced in the secondary-side coil Ls is rectified by the synchronous rectifier transistor Q1 and smoothed by the smoothing capacitor C0, so that an output voltage Vout is output through the output terminal OUT. In the case of an AC-DC converter, a direct-current voltage input to the primary-side coil of the transformer TR is a voltage generated by a diode bridge rectifying and a smoothing capacitor smoothing an alternating current (AC).

The DC converter of this embodiment further includes a synchronous rectifier control circuit 10 including an external terminal VD to which a drain voltage Vd of the synchronous rectifier transistor Q1 is input and an external terminal VG through which a gate control voltage VGS for the synchronous rectifier transistor Q1 is output. The synchronous rectifier control circuit 10 further includes a ground terminal GND to which a reference potential as a reference for the operation of the synchronous rectifier control circuit 10 is applied. Hence, the synchronous rectifier control circuit 10 can monitor a drain-source voltage of the synchronous rectifier transistor Q1. The synchronous rectifier control circuit 10 of this embodiment is configured as a semiconductor integrated circuit (IC) mounted on a single semiconductor chip or as a semiconductor device installed in a single package.

The synchronous rectifier control circuit 10 further includes a power supply terminal to which the output voltage Vout, which is output from the output terminal OUT, is applied, and circuits therein operate with, as a power supply voltage, an internal power supply voltage REG generated by a series regulator or the like stepping down the output voltage Vout.

The synchronous rectifier control circuit 10 further includes an ON detection circuit 11 (ON-timing detection circuit) and an OFF detection circuit 12 (OFF-timing detection circuit) that detect a turn-on timing to turn on and a turn-off timing to turn off the synchronous rectifier transistor Q1, respectively, on the basis of the drain voltage Vd of the synchronous rectifier transistor Q1 input to the external terminal VD. The ON detection circuit 11 compares the drain voltage Vd with a turn-on threshold voltage Vth_ON to detect the turn-on timing, and the OFF detection circuit 12 compares the drain voltage Vd with a turn-off threshold voltage Vth_OFF to detect the turn-off timing.

The synchronous rectifier control circuit 10 further includes drain voltage detection circuits 13A, 13B, 13C that compare the drain voltage Vd of the synchronous rectifier transistor Q1 with their respective threshold voltages Vth1, Vth2, Vth3 to detect which is lager (or smaller), the drain voltage Vd or the threshold voltages Vth1, Vth2, Vth3, respectively, and a discharge circuit 14 that monitors the drain voltage Vd of the synchronous rectifier transistor Q1 to detect a discharge start timing of the gate terminal of the synchronous rectifier transistor Q1, and discharges the gate terminal of (external terminal VG for) the synchronous rectifier transistor Q1.

The synchronous rectifier control circuit 10 further includes an ON/OFF control circuit 15 that generates an ON/OFF control signal ON/OFF for the synchronous rectifier transistor Q1 on the basis of an output signal ON_SIG of the ON detection circuit 11 and an output signal OFF_SIG of the OFF detection circuit 12, and a gate driver 16 that drives the external terminal VG on the basis of the generated ON/OFF control signal ON/OFF to output the gate control voltage VGS.

More specifically, when the drain voltage Vd becomes lower than the turn-on threshold voltage Vth_ON, the gate control voltage VGS is changed to High level and the synchronous rectifier transistor Q1 is turned on, whereas when the drain voltage Vd becomes higher than the turn-off threshold voltage Vth_OFF, the gate control voltage VGS is changed to Low level and the synchronous rectifier transistor Q1 is turned off.

The ON detection circuit 11, the OFF detection circuit 12 and the drain voltage detection circuits 13A, 13B, 13C each may be composed of a comparator (voltage comparison circuit) and/or the like. The discharge circuit 14 may be composed of a comparator (voltage comparison circuit) and a switch element for discharge connected between the external terminal VG and the ground terminal GND to which a reference potential as a reference for the operation of the synchronous rectifier control circuit 10 is applied, the reference potential being the same as that on the source side of the synchronous rectifier transistor Q1.

The discharge circuit 14 performs the discharge when determining that the drain voltage Vd of the synchronous rectifier transistor Q1 has reached a discharge start voltage Vth4.

In order that the synchronous rectifier transistor Q1 is turned off after the discharge of releasing a charge of the gate terminal of the synchronous rectifier transistor Q1 is performed, the turn-off threshold voltage Vth_OFF is corrected to a value higher than the discharge start voltage Vth4. Hence, if the OFF detection circuit 12 determines that the drain voltage Vd has reached the turn-off threshold voltage Vth_OFF after start of the discharge, the output signal ON/OFF of the ON/OFF control circuit 15 changes, the gate driver 16 drives the external terminal VG to Low level, and the synchronous rectifier transistor Q1 is turned off. More specifically, as a drain current Ids gets closer to 0 A, the drain voltage Vd changes in accordance with a formula for a drain voltage of an MOS transistor ($VD=Ids\times(Ron+R)+L\times dIds/dt$), and when the drain voltage Vd exceeds the turn-off threshold voltage Vth_OFF, the synchronous rectifier transistor Q1 is turned off. In the formula for the drain voltage, Ron represents the ON-resistance of the synchronous rectifier transistor Q1, R represents parasitic resistance of a wiring pattern, and L represents parasitic inductance of the wiring pattern.

Figure 5:
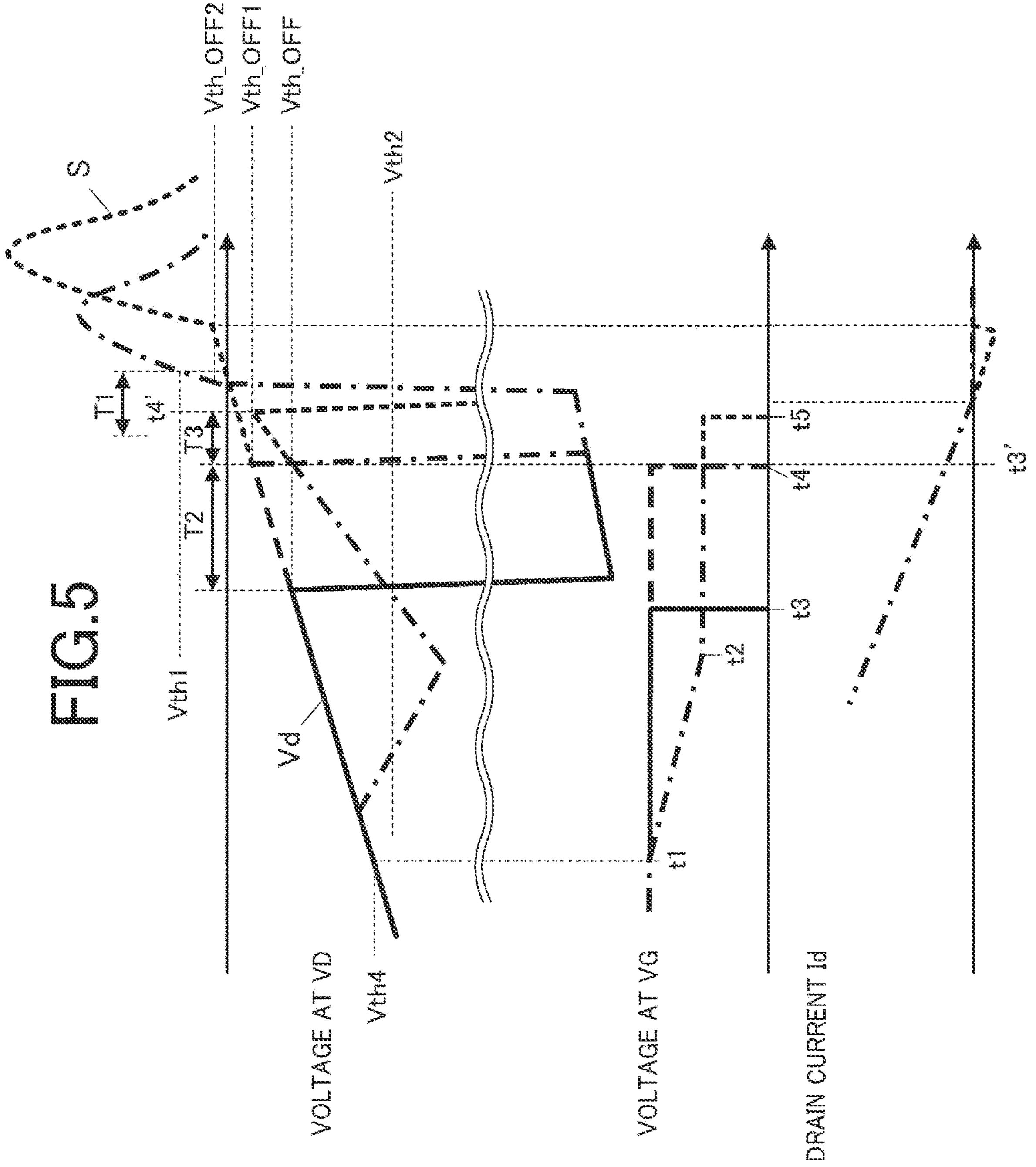
FIG. 5 is a waveform chart showing a T0 period shown in FIG. 4 enlarged.

When a gate voltage of the synchronous rectifier transistor Q1 decreases to a gate threshold voltage for the MOS transistor or so, the ON-resistance of the synchronous rectifier transistor Q1 changes, and this affects the waveform of the drain voltage Vd. When detecting this change, the discharge circuit 14 of this embodiment stops the discharge. Thereafter, when the drain voltage Vd reaches the turn-off threshold voltage Vth_OFF, the external terminal VG is driven to Low level and the synchronous rectifier transistor Q1 is turned off. Accordingly, the gate voltage of the synchronous rectifier transistor Q1 changes stepwise immediately before the synchronous rectifier transistor Q1 is turned off (FIG. 5). The drain voltage Vd increases in accordance with the waveform of a drain current Id, thereby reaching the turn-off threshold voltage Vth_OFF. The stepwise change of the gate voltage of the synchronous rectifier transistor Q1 can be realized, for example, by providing the discharge circuit 14 with a timer or a comparator. The stepwise change of the gate voltage is not limited to two levels. Each time the drain voltage Vd reaches the turn-off threshold voltage Vth_OFF, the turn-off threshold voltage Vth_OFF may be corrected, and the stepwise change of the gate voltage may be more than two levels accordingly.

The threshold voltage Vth1, which is used by the drain voltage detection circuit 13A (first detection circuit), is for determining a secondary-side conductive period on the basis of the drain voltage Vd of the synchronous rectifier transistor Q1. When a primary-side conductive period finishes and the drain voltage Vd falls to or below the threshold voltage Vth1, the drain voltage detection circuit 13A outputs a signal VDL of High level. When (i) the drain voltage Vd further decreases, (ii) the output signal ON_SIG of the ON detection circuit 11 changes and (iii) the ON/OFF control circuit 15 determines that a turn-on condition (Vd<Vth_ON) is met, the gate control voltage VGS for the synchronous rectifier transistor Q1 is changed to High level. The output signal VDL of the drain voltage detection circuit 13A is supplied to a protection determination circuit 17 and a voltage adjustment circuit 18, which will be described later.

The threshold voltage Vth2, which is used by the drain voltage detection circuit 13B (voltage decrease detection circuit, second detection circuit), is for detecting a situation where the waveform of the drain voltage Vd is downward due to increase in the ON-resistance of the synchronous rectifier transistor Q1 or increase in the drain current Id thereof. When the drain voltage detection circuit 13B detects such a situation by using the threshold voltage Vth2, the drain voltage detection circuit 13B outputs a signal VD_fall of High level.

Figure 4:
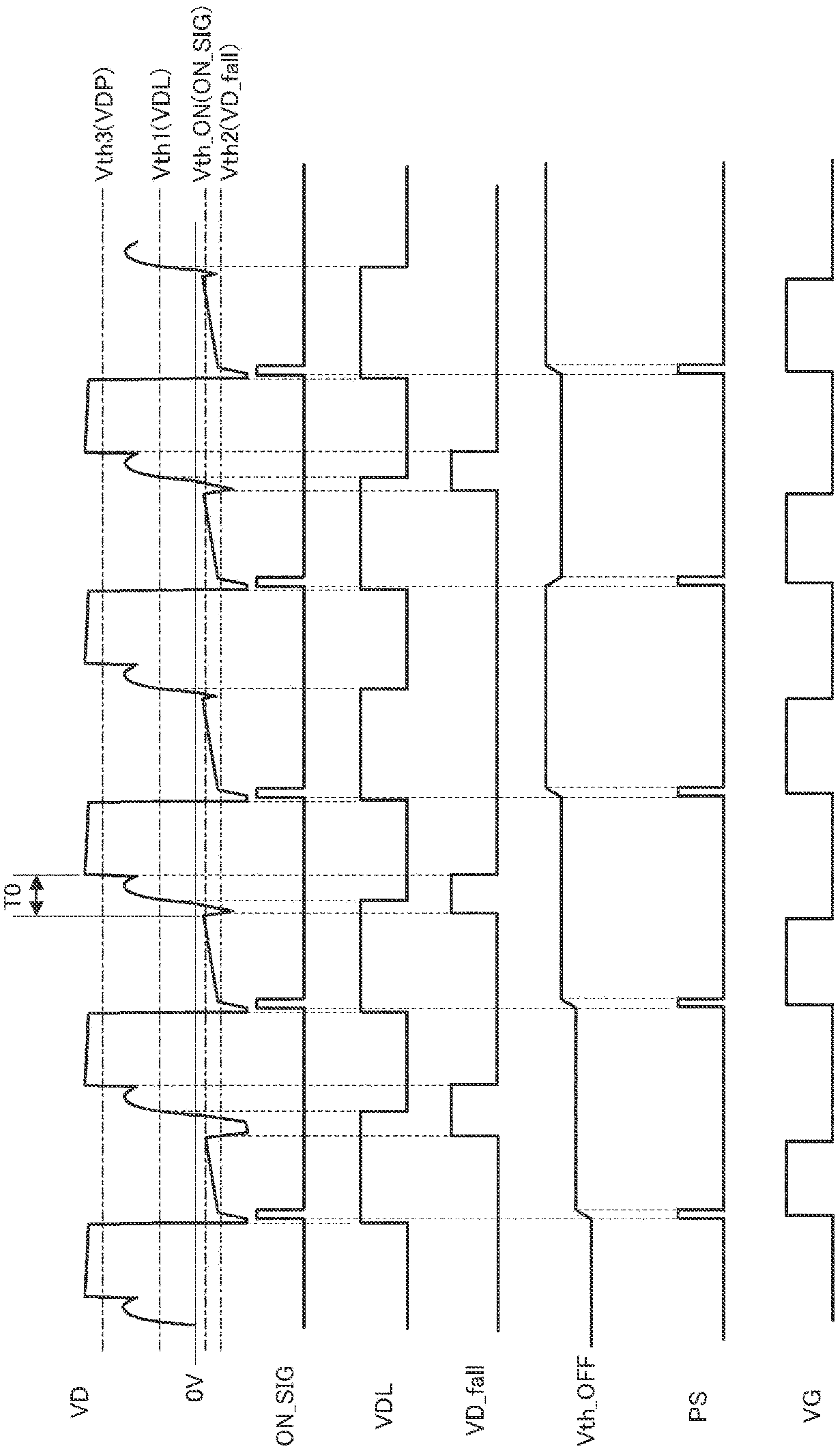
FIG. 4 is a timing chart showing changes in a drain voltage of a synchronous rectifier transistor and in signals in the synchronous rectifier control circuit of the DC converter shown in FIG. 1.

The threshold voltage Vth3, which is used by the drain voltage detection circuit 13C, is for detecting that the secondary-side conductive period has finished and the drain voltage Vd has increased. The threshold voltage Vth3 is set at a value higher than the threshold voltage Vth1. When the drain voltage detection circuit 13C detects that Vd>Vth3, the drain voltage detection circuit 13C outputs a signal VDP. This signal VDP is supplied to the drain voltage detection circuit 13B. Under the condition that the signal VDP is High level (or Low level), the drain voltage detection circuit 13B changes the signal VD_fall to High level when detecting that the drain voltage Vd is less than the threshold voltage Vth2, and changes the signal VD_fall to Low level when detecting the signal VDP, as shown in FIG. 4 as an example.

The synchronous rectifier control circuit 10 of this embodiment further includes the aforementioned protection determination circuit 17 that determines whether to perform a protection operation and generates a determination signal JDG_SG on the basis of the output signal OFF_SIG of the OFF detection circuit 12 and the output signal VDL of the drain voltage detection circuit 13A, and the aforementioned voltage adjustment circuit 18 that adjusts the turn-off threshold voltage Vth_OFF, which is used by the OFF detection circuit 12. The voltage adjustment circuit 18 adjusts the turn-off threshold voltage Vth_OFF on the basis of the output signal VDL of the drain voltage detection circuit 13A, the output signal VD_fall of the drain voltage detection circuit 13B, the determination signal JDG_SIG from the protection determination circuit 17 and the output signal ON_SIG of the ON detection circuit 11.

More specifically, the voltage adjustment circuit 18 corrects the turn-off threshold voltage Vth_OFF to be higher when determining on the basis of the signal VD_fall from the drain voltage detection circuit 13B that a situation where the waveform of the drain voltage Vd is downward due to increase in the ON-resistance of the synchronous rectifier transistor Q1 or increase in the drain current Id thereof has occurred. Meanwhile, the voltage adjustment circuit 18 has a function of correcting the turn-off threshold voltage Vth_OFF to be lower when determining that such a situation has not occurred. That is, the voltage adjustment circuit 18 corrects the turn-off threshold voltage Vth_OFF such that the turn-off timing of the synchronous rectifier transistor Q1 gets closer to a point at which the current flowing in the synchronous rectifier transistor Q1 becomes zero.

Providing this function can solve the aforementioned Problem 3 that early turn-off of the synchronous rectifier transistor Q1 makes the rectification period by the body diode long and increases the loss, and also solve the aforementioned Problem 4 that the gate terminal decreases at an early stage and accordingly the ON resistance increases, which may increase conduction loss.

The protection determination circuit 17 has a function of prohibiting the voltage adjustment circuit 18 from correcting the turn-off threshold voltage Vth_OFF to be higher in a preset protection operation period (T1, which will be described below). The reason for providing this function is to deal with a situation where the situation where the downward slope of the waveform of the drain voltage Vd due to increase in the ON-resistance of the synchronous rectifier transistor Q1 or increase in the drain current Id thereof is difficult to detect in a deep current continuous mode or the like. By determining that it is the protection operation period, a stable point of the turn-off threshold voltage Vth_OFF after corrected can be set at a point before the drain current Id flows backward.

Figure 2:
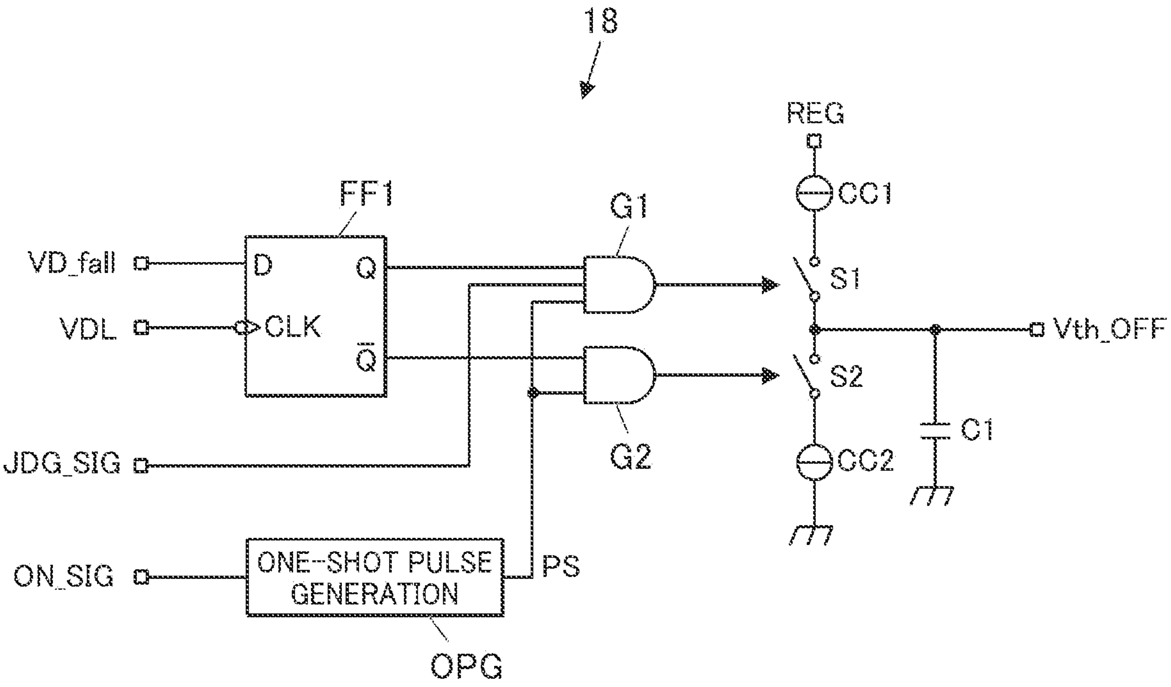
FIG. 2 is a circuit diagram showing an example of the configuration of a voltage adjustment circuit that constitutes a synchronous rectifier control circuit (IC) of the DC converter shown in FIG. 1.
Figure 3:
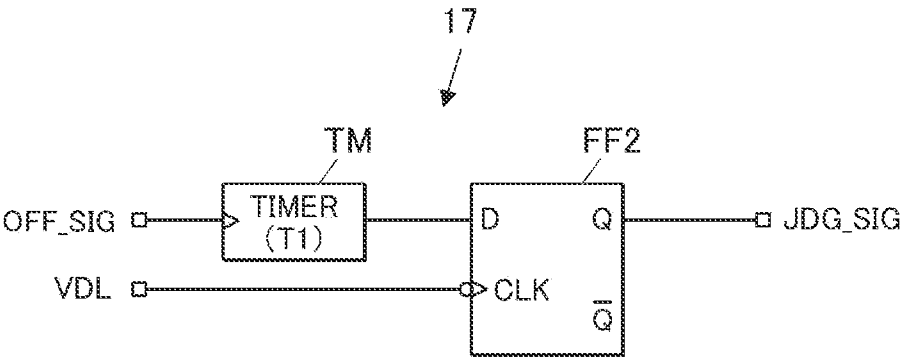
FIG. 3 is a circuit diagram showing an example of the configuration of a protection determination circuit that constitutes the synchronous rectifier control circuit (IC) of the DC converter shown in FIG. 1.

FIG. 2 shows a specific configuration example of the voltage adjustment circuit 18 of the synchronous rectifier control circuit 10 shown in FIG. 1. FIG. 3 shows a specific configuration example of the protection determination circuit 17 of the synchronous rectifier control circuit 10 shown in FIG. 1.

As shown in FIG. 2, the voltage adjustment circuit 18 includes a flip-flop FF1 (first latch circuit) having a D terminal to which a signal as a latching target is input and a one-shot pulse generation circuit OPG that generates and outputs a one-shot pulse signal PS in response to a rise of the output signal ON_SIG of the ON detection circuit 11. The output signal VDL of the drain voltage detection circuit 13A is input to a clock terminal CLK of the flip-flop FF1. The flip-flop FF1 takes in and holds the signal VD_fall input to the D terminal in sync with a rise of the signal VDL.

The voltage adjustment circuit 18 further includes an AND gate G1 (first logic circuit) to which an output signal Q of the flip-flop FF1, the determination signal JDG_SIG from the protection determination circuit 17 and the pulse signal PS from the one-shot pulse generation circuit OPG are input and an AND gate G2 (second logic circuit) to which an inverted output signal $\overline{Q}$ of the flip-flop FF1 and the pulse signal PS from the one-shot pulse generation circuit OPG are input.

The voltage adjustment circuit 18 further includes a switch element S1 that is controlled to be on/off by an output signal of the AND gate G1, a constant current source CC1 connected between the switch element S1 and a terminal to which the internal power supply voltage REG is applied, a switch element S2 that is controlled to be on/off by an output signal of the AND gate G2, and a constant current source CC2 connected between the switch element S2 and a ground point. The switch elements S1, S2 are connected in series, and a capacitor C1 is connected between a connection node of the switch elements S1, S2 and a ground point. Hence, the switch element S1 functions as a switch that charges the capacitor C1, and the switch element S2 functions as a switch that discharges the capacitor C1. The constant current sources CC1, CC2 each may be composed of a current mirror circuit.

As shown in FIG. 3, the protection determination circuit 17 includes a timer circuit TM that is started by a rise of the output signal OFF_SIG of the OFF detection circuit 12 and measures a preset time (period) (T1) and a flip-flop FF2 (second latch circuit) having a D terminal to which a time-up signal of the timer circuit TM is input. The output signal VDL of the drain voltage detection circuit 13A is input to a clock terminal CLK of the flip-flop FF2. The flip-flop FF2 takes in and holds the time-up signal of the timer circuit TM input to the D terminal in sync with a rise of the signal VDL. An output signal Q of the flip-flop FF2 is output to the voltage adjustment circuit 18 as the determination signal JDG_SIG.

The configuration of the voltage adjustment circuit 18 is not limited to that shown in FIG. 2. For example, the voltage generation circuit (constant current sources CC1, CC2, switch elements S1, S2, and capacitor C1) as the latter part of the voltage adjustment circuit 18 may be composed of an up-down counter and a D/A conversion circuit, for example.

The protection determination circuit 17 is configured as described above. Hence, when the OFF detection circuit 12 detects the turn-off timing, and the output signal OFF_SIG rises, the timer circuit TM starts to measure time, and if the output signal VDL of the drain voltage detection circuit 13A changes to Low level before the timer circuit TM finishes measuring a predetermined fixed time (T1), the protection determination circuit 17 outputs the signal JDG_SIG of Low level to the voltage adjustment circuit 18, thereby prohibiting the voltage adjustment circuit 18 from performing the correction.

On the other hand, if the output signal VDL of the drain voltage detection circuit 13A changes to Low level after the timer circuit TM finishes measuring the predetermined fixed time (T1), the protection determination circuit 17 outputs the signal JDG_SIG of High level to the voltage adjustment circuit 18, thereby not prohibiting the voltage adjustment circuit 18 from performing the correction. That is, if the time from when the synchronous rectifier transistor Q1 is turned off to when the drain voltage Vd increases is equal to or less than the preset/predetermined time, the voltage adjustment circuit 18 is prohibited from changing the turn-off threshold voltage Vth_OFF to be higher. Since the signal JDG_SIG is not input to the AND gate G2 of the voltage adjustment circuit 18, the voltage adjustment circuit 18 is not prohibited from correcting/adjusting the turn-off threshold voltage Vth_OFF to be lower, regardless of the signal JDG_SIG.

FIG. 4 is a timing chart showing changes in the drain voltage Vd of the synchronous rectifier transistor Q1 and the signals in the synchronous rectifier control circuit 10 of the DC converter shown in FIG. 1.

Hereinafter, operation of the synchronous rectifier control circuit 10 shown in FIG. 1 will be described with reference to waveform charts shown in FIG. 4 to FIG. 6. FIG. 4 shows the operating waveforms of the synchronous rectifier control circuit 10 for five cycles. FIG. 5 shows a T0 period (period before and after Q1 is turned off) shown in FIG. 4 enlarged.

In FIG. 5, solid lines indicate changes in the drain voltage Vd and the gate control voltage VGS in a case where the turn-off threshold voltage Vth_OFF is corrected with the synchronous rectifier transistor Q1 being low ON-resistance, dash-dot lines indicate changes in the drain voltage Vd and the gate control voltage VGS as well as the drain current Id of the synchronous rectifier transistor Q1 in a case where the turn-off threshold voltage Vth_OFF is corrected with the synchronous rectifier transistor Q1 being high ON-resistance, and broken lines indicate waveforms after the turn-off threshold voltage Vth_OFF is corrected.

As shown in FIG. 5, in the case where the synchronous rectifier transistor Q1 is low ON-resistance, before correction of the turn-off threshold voltage Vth_OFF, when the drain voltage Vd reaches the pre-corrected turn-off threshold voltage Vth_OFF, the gate control voltage VGS falls to Low level and the synchronous rectifier transistor Q1 is turned off (t3), whereas after correction of the turn-off threshold voltage Vth_OFF, when the drain voltage Vd reaches a post-corrected turn-off threshold voltage Vth_OFF1, the gate control voltage VGS falls to Low level and the synchronous rectifier transistor Q1 is turned off (t3'), wherein t3' represents a timing at which the drain current Id is closer to zero than t3. Thus, in the case where the synchronous rectifier transistor Q1 is low ON-resistance, correcting the turn-off threshold voltage Vth_OFF can prevent the rectification period by the body diode from being long and the loss from increasing even if the turn-off threshold voltage Vth_OFF has a variation due to variation in the manufacturing process.

In the case where the synchronous rectifier transistor Q1 is high ON-resistance, first, at a timing t1 at which the drain voltage Vd reaches the discharge start voltage Vth4 with the synchronous rectifier transistor Q1 being low ON-resistance, the gate control voltage VGS starts to decrease, so that the ON-resistance increases and the drain voltage Vd decreases accordingly. The drain detection circuit 13B detects this decrease and changes the output signal VD_fall, so that the gate control voltage VGS is held at Low level (t2). Thereafter, the drain voltage Vd increases, and before correction of the turn-off threshold voltage Vth_OFF, when the drain voltage Vd reaches the pre-corrected turn-off threshold voltage Vth_OFF, the gate control voltage VGS falls to Low level and the synchronous rectifier transistor Q1 is turned off (t4).

Meanwhile, after correction of the turn-off threshold voltage Vth_OFF, when the drain voltage Vd reaches the post-corrected turn-off threshold voltage Vth_OFF1, the gate control voltage VGS falls to Low level and the synchronous rectifier transistor Q1 is turned off (t4'). Thus, in the case where the synchronous rectifier transistor Q1 is high ON-resistance, correcting the turn-off threshold voltage Vth_OFF can make the turn-off timing of the synchronous rectifier transistor Q1 further closer to the point at which the drain current Id becomes zero, as compared with the case where the synchronous rectifier transistor Q is low ON-resistance.

Figure 10:
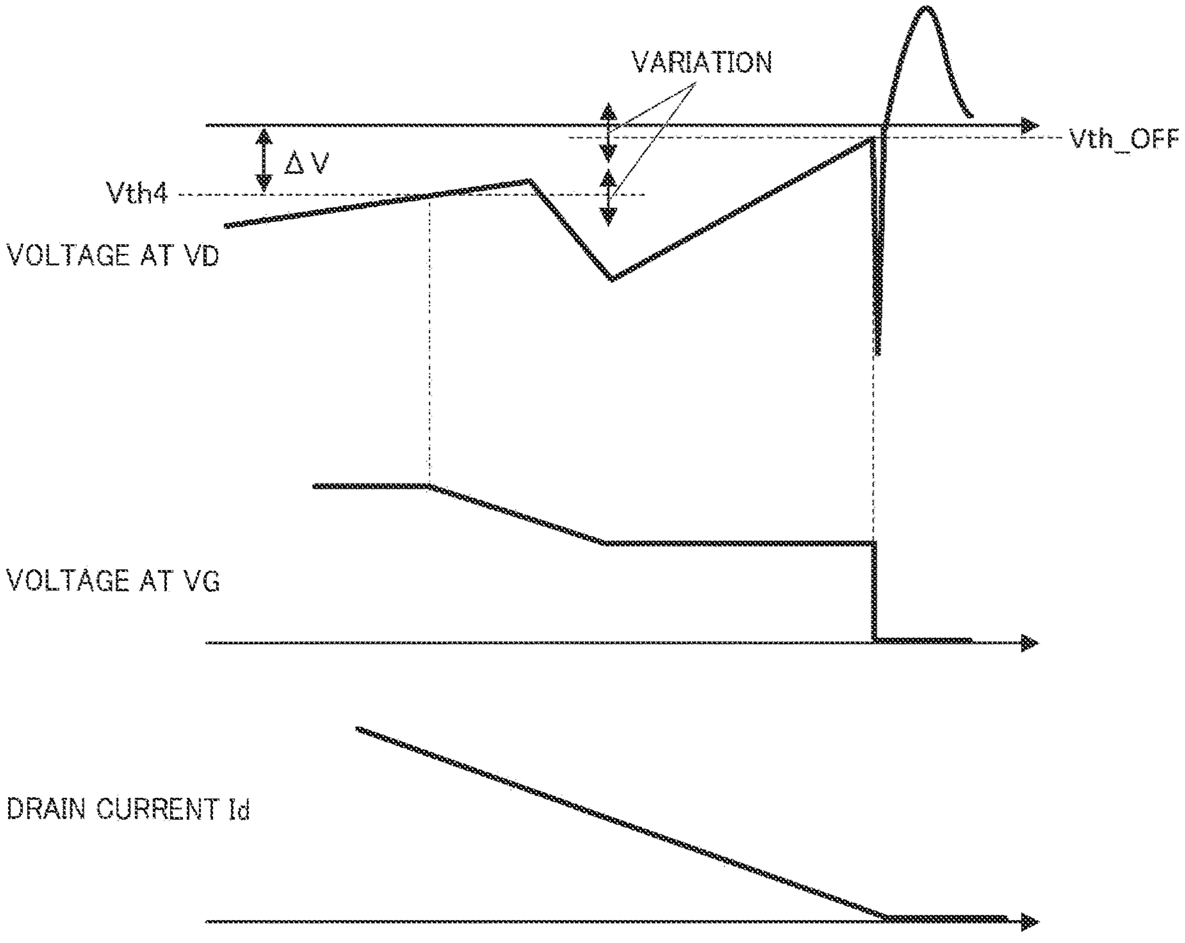
FIG. 10 is a waveform chart showing how the drain voltage and the gate voltage of a synchronous rectifier transistor in a DC converter change before and after the synchronous rectifier transistor is turned off, wherein the DC converter discharges the gate terminal of the synchronous rectifier transistor immediately before the synchronous rectifier transistor is turned off.
Figure 11:
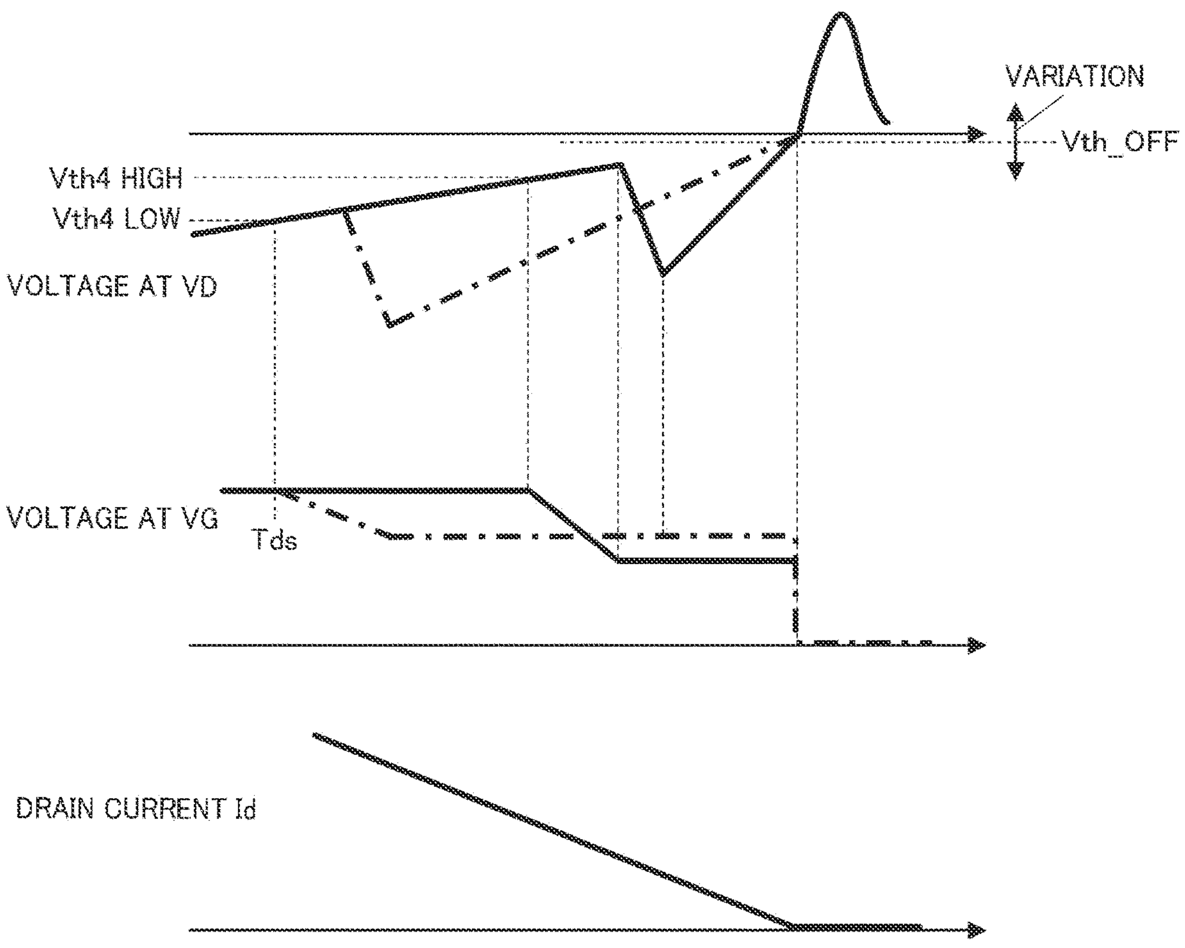
FIG. 11 is a waveform chart showing how the drain voltage and the gate voltage of the synchronous rectifier transistor change before and after the synchronous rectifier transistor is turned off in a case where a discharge start voltage for starting to discharge the gate terminal of the synchronous rectifier transistor immediately before the synchronous rectifier transistor is turned off is high and a case where the discharge start voltage is low.

As described above, it is necessary, as shown in FIG. 10, to provide the potential difference ΔV including a margin for preventing malfunctions between the turn-off threshold voltage Vth_OFF and the discharge start voltage Vth4 since the turn-off threshold voltage Vth_OFF and the discharge start voltage Vth4 may have variations due to variation in manufacturing or an operating condition. In order not to shift to the turn-off operation before the discharge starts, the DC converter of this embodiment is configured as described above and can set the discharge start voltage Vth4 at a relatively high value, thereby shortening a period in which the ON-resistance is high immediately before the synchronous rectifier transistor Q1 is turned off. As a result, the conduction loss in the synchronous rectifier transistor Q1 can be reduced.

In FIG. 5, T2 is a period in which the voltage adjustment circuit 18 can correct the turn-off threshold voltage Vth_OFF in the case where the synchronous rectifier transistor Q1 is low ON-resistance, and T3 is a period in which the voltage adjustment circuit 18 can correct the turn-off threshold voltage Vth_OFF in the case where the synchronous rectifier transistor Q1 is high ON-resistance. As can be seen from FIG. 5, T3 is narrower/shorter than T2, namely, T3<T2. This can reduce the influence of the correction/ adjustment accuracy of the turn-off threshold voltage Vth_OFF, and make the rectification period by the body diode of the synchronous rectifier transistor Q1 immediately before the synchronous rectifier transistor Q1 is turned off shorter than that in the case where the synchronous rectifier transistor Q1 is low ON-resistance, thereby reducing the loss. The "T3<T2" is due to the upward slope of the waveform of the drain voltage Vd being steeper in the case where the synchronous rectifier transistor Q1 is high ON-resistance (dash-dot line in FIG. 5) than in the case where the synchronous rectifier transistor Q1 is low ON-resistance (solid line in FIG. 5).

Next, the function of prohibiting the voltage adjustment circuit 18 from correcting the turn-off threshold voltage Vth_OFF to be higher, which the protection determination circuit 17 has, and advantages thereof will be described with reference to FIG. 5 and FIG. 6. In FIG. 5, T1 is the period in which the protection determination circuit 17 performs the protection operation.

Figure 6:
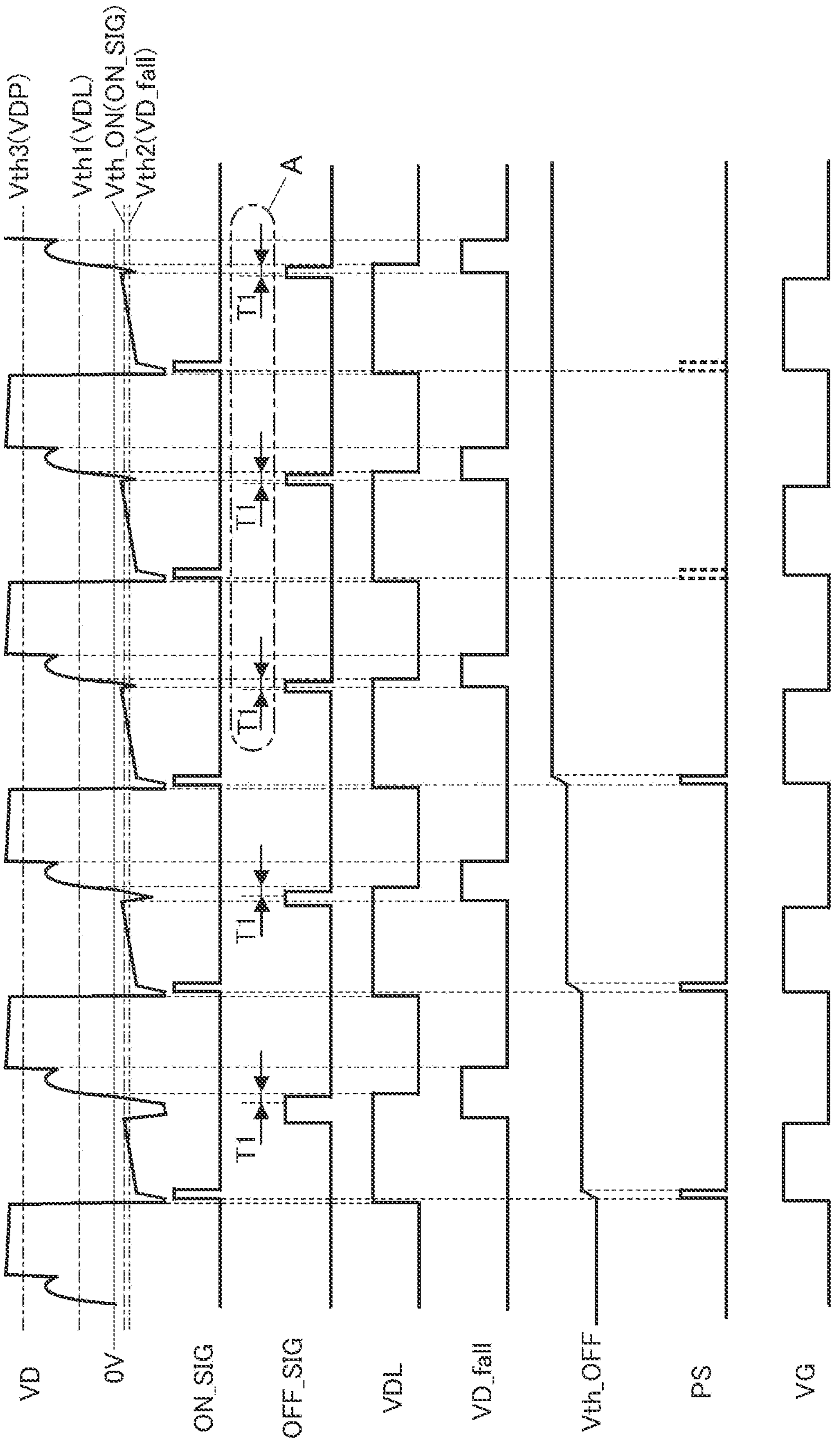
FIG. 6 is a timing chart showing changes in the signals in the synchronous rectifier control circuit in a case where a protection function of the protection determination circuit works.
Figure 7:
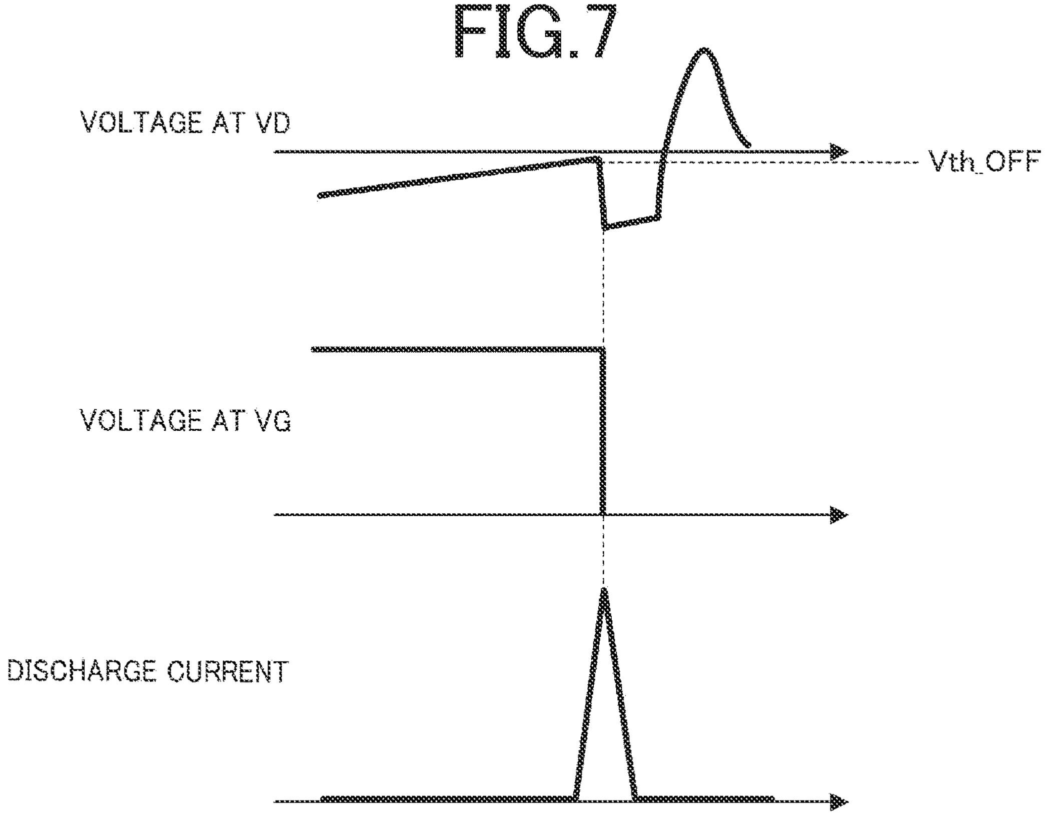
FIG. 7 is a waveform chart showing how a drain voltage, a gate voltage and a discharge current of a synchronous rectifier transistor in a conventional DC converter with synchronous rectification change when the synchronous rectifier transistor is turned off.
Figure 8:
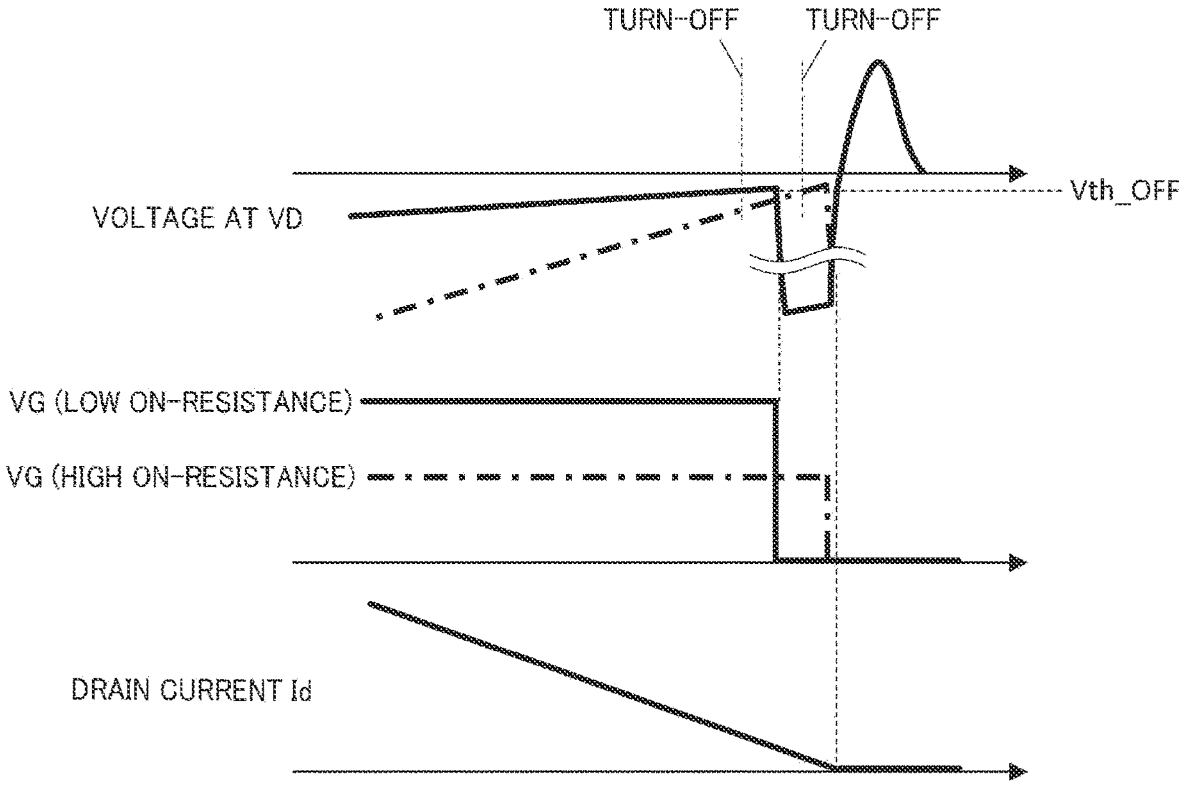
FIG. 8 is a waveform chart showing how the drain voltage, the gate voltage and a drain current of the synchronous rectifier transistor in the conventional DC converter with synchronous rectification change in a case where the gate voltage is high and a case where the gate voltage is low.
Figure 9:
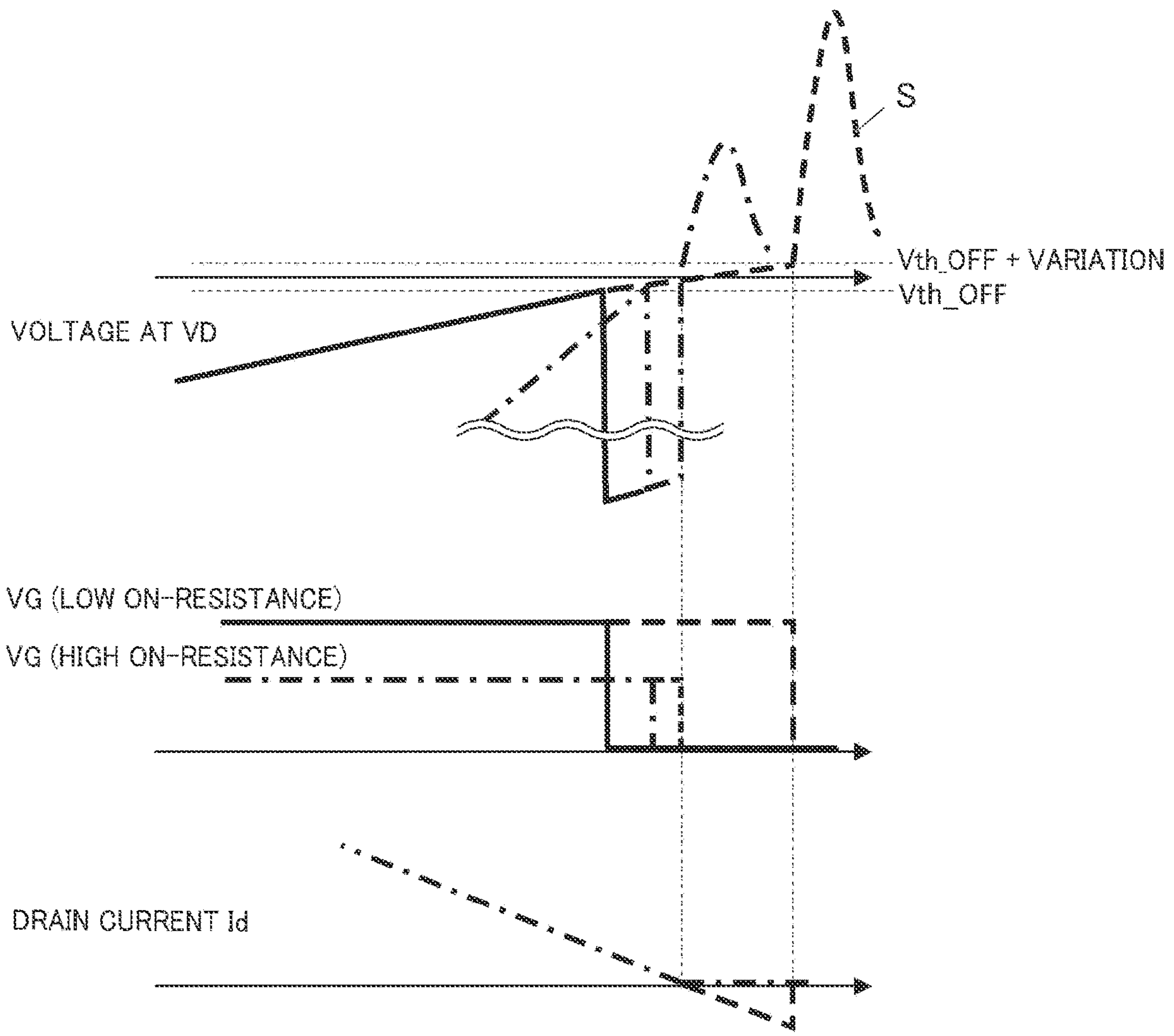
FIG. 9 is a waveform chart showing how the drain voltage of the synchronous rectifier transistor changes if a turn-off threshold voltage has a variation in the case where the gate voltage is high and the case where the gate voltage is low.

In this embodiment, since the function of prohibiting the voltage adjustment circuit 18 from correcting the turn-off threshold voltage Vth_OFF to be higher is provided, as shown in FIG. 6, under the situation represented by an oval of a dash-dot line A where turn-off of the synchronous rectifier transistor occurs in the vicinity of the protection operation period T1, even if the pulse signal PS is output from the one-shot pulse generation circuit OPG in sync with a rise of the output signal VDL of the drain voltage detection circuit 13A, the correction to increase the turn-off threshold voltage Vth_OFF is not performed, and the level thereof immediately before is maintained.

If the function of prohibiting the voltage adjustment circuit 18 from correcting the turn-off threshold voltage Vth_OFF to be higher is not provided, the voltage adjustment circuit 18 corrects the turn-off threshold voltage Vth_OFF to be higher, so that there is a risk that a post-corrected turn-off threshold voltage Vth_OFF2 is higher than 0 V, and the drain current Id becomes negative, namely, backflow occurs in the synchronous rectifier transistor Q1. When the backflow occurs, as indicated by a broken line S in FIG. 5, a surge voltage occurs in the drain voltage Vd. On the other hand, if the function of prohibiting the voltage adjustment circuit 18 from correcting the turn-off threshold voltage Vth_OFF to be higher is provided as described above, a situation where the turn-off threshold voltage Vth_OFF after corrected by the voltage adjustment circuit 18 is as high as the post-corrected threshold voltage Vth_OFF2 can be avoided, which prevents a surge voltage from occurring in the drain voltage Vd.

As described above, according to the present disclosure, it is possible to reduce the current peak at the time of turn-off of the synchronous rectifier transistor and suppress high-frequency noise. Further, it is possible to reduce the loss in the synchronous rectifier transistor by shortening the rectification period by the body diode immediately before turn-off of the synchronous rectifier transistor. Still further, it is possible to set the level of the discharge start voltage to be high by adjusting the turn-off threshold voltage for the synchronous rectifier transistor to the optimum voltage value, thereby suppressing increase in the conduction loss.

Although one or more embodiments of the present disclosure made by the present inventors have been described above, the present disclosure is not limited to the embodiments. For example, the synchronous rectifier control circuit 10 of the above embodiment includes the drain voltage detection circuit 13B composed of a comparator and/or the like. However, what this drain voltage detection circuit 13B needs to do is detecting increase in the ON-resistance or increase in the current value. Hence, the drain voltage detection circuit 13B may be configured to detect the downward slope of the waveform of the drain voltage Vd and use it as a determination reference. Further, as a circuit other than a comparator, a logic circuit that extracts only a necessary signal(s) may be provided.

Further, in the synchronous rectifier control circuit 10 of the above embodiment, the turn-off threshold voltage Vth_OFF is corrected in sync with the output signal ON_SIG of the ON detection circuit 11, but may be corrected in sync with another signal (e.g., VDL or VD_fall). Further, for the purpose of stability, the turn-off threshold voltage Vth_OFF may be corrected when another condition is met, for example, when a timing signal for the correction has been observed multiple times.

Further, the synchronous rectifier circuit to which the present disclosure is applied is not limited to the half-wave synchronous rectifier circuit provided with one secondary-side coil as in the above embodiment. The present disclosure is applicable to synchronous rectifier circuits of different power supply methods. For example, the present disclosure is applicable to a converter and a full-wave synchronous rectifier circuit provided with two secondary-side coils. Further, the present disclosure is applicable not only to the flyback switching power supply device but also to a forward switching power supply device and a resonant switching power supply device.

Although one or more embodiments of the present disclosure have been described above, the scope of the disclosure is not limited to the embodiments described above but includes the scope of claims below and the scope of their equivalents.

The invention claimed is:

1. A switching power supply device with synchronous rectification, comprising:
- a transformer that receives an input voltage on a primary side;
- a synchronous rectifier element that conducts/breaks a current of a secondary-side coil of the transformer; and
- a synchronous rectifier control circuit that drives the synchronous rectifier element to be on/off,
- wherein the synchronous rectifier control circuit includes:
  - an ON-timing detection circuit that detects a turn-on timing to turn on the synchronous rectifier element based on a terminal voltage of the synchronous rectifier element;
  - an OFF-timing detection circuit that detects a turn-off timing to turn off the synchronous rectifier element by comparing the terminal voltage of the synchronous rectifier element with a predetermined turn-off threshold voltage;
  - an ON/OFF control circuit that generates an ON/OFF control signal for the synchronous rectifier element based on an output signal of the ON-timing detection circuit and an output signal of the OFF-timing detection circuit;
  - a discharge circuit that performs discharge of releasing a charge of a gate terminal of the synchronous rectifier element before the turn-off timing of the synchronous rectifier element to reduce a gate voltage of the gate terminal;

a voltage adjustment circuit that, based on a change in the terminal voltage of the synchronous rectifier element, corrects the predetermined turn-off threshold voltage such that the turn-off timing of the synchronous rectifier element gets closer to a point at which a current flowing in the synchronous rectifier element becomes zero, the predetermined turn-off threshold voltage being used by the OFF-timing detection circuit to detect the turn-off timing of the synchronous rectifier element;

a first detection circuit that detects a state in which the terminal voltage of the synchronous rectifier element is equal to or less than a predetermined potential; and a second detection circuit that detects a decrease in the terminal voltage of the synchronous rectifier element after the discharge circuit starts the discharge, wherein the voltage adjustment circuit includes:

a first latch circuit that takes in an output signal of the second detection circuit in response to a change in an output signal of the first detection circuit;

a pulse generation circuit that generates a pulse signal having a predetermined pulse width in response to a change in the output signal of the ON-timing detection circuit;

a first logic circuit that obtains a logical product of an output signal of the first latch circuit and the pulse signal generated by the pulse generation circuit; and a second logic circuit that obtains a logical product of an inverted output signal of the first latch circuit and the pulse signal generated by the pulse generation circuit, and wherein the voltage adjustment circuit changes the predetermined turn-off threshold voltage to be higher by a first predetermined amount based on an output signal of the first logic circuit, and changes the predetermined turn-off threshold voltage to be lower by a second predetermined amount based on an output signal of the second logic circuit, the second predetermined amount being identical with or different from the first predetermined amount.

2. The switching power supply device with synchronous rectification according to claim 1, wherein the synchronous rectifier control circuit further includes a determination circuit that prohibits the voltage adjustment circuit from changing the predetermined turn-off threshold voltage to be higher, and wherein the determination circuit prohibits the voltage adjustment circuit from changing the predetermined turn-off threshold voltage to be higher in a case where a time from when the synchronous rectifier element is turned off to when the terminal voltage increases is equal to or less than a predetermined time.

3. The switching power supply device with synchronous rectification according to claim 2, wherein the determination circuit includes:

a timer circuit that starts to measure the predetermined time in response to a change in the output signal of the OFF-timing detection circuit; and a second latch circuit that takes in a state of an output signal of the timer circuit in response to the change in the output signal of the first detection circuit, and wherein an output signal of the second latch circuit is input to the first logic circuit.

4. The switching power supply device with synchronous rectification according to claim 1, wherein after starting the discharge, the discharge circuit stops the discharge before a control voltage for the synchronous rectifier element decreases to a potential at which the synchronous rectifier element is put in an OFF state to shift the synchronous rectifier element from a low ON-resistance state as a state before the discharge circuit starts the discharge to a high ON-resistance state.

* * * * *